United States Patent
Jensen

(10) Patent No.: US 7,660,579 B2
(45) Date of Patent: Feb. 9, 2010

(54) COMMUNICATION NETWORK ACCELERATION SYSTEM AND METHOD

(76) Inventor: James W. Jensen, c/o Satcom Direct, Inc., P.O. Box 372667, Satellite Beach, FL (US) 32937

( * ) Notice: Subject to any disclaimer, the term of this patent is extended or adjusted under 35 U.S.C. 154(b) by 604 days.

(21) Appl. No.: 11/426,763

(22) Filed: Jun. 27, 2006

(65) Prior Publication Data

US 2006/0293049 A1     Dec. 28, 2006

Related U.S. Application Data

(60) Provisional application No. 60/694,289, filed on Jun. 27, 2005.

(51) Int. Cl.
*H04Q 7/20*      (2006.01)

(52) U.S. Cl. .................. 455/431; 455/12.1; 455/556.1; 455/428; 455/430

(58) Field of Classification Search ............... 455/12.1, 455/431, 456, 121, 188.1, 427, 428, 13.3, 455/13.2, 430, 266, 67.6, 429, 441, 11.1, 455/13.1, 556.1, 557
See application file for complete search history.

(56) References Cited

U.S. PATENT DOCUMENTS

| | | | | |
|---|---|---|---|---|
| 5,937,349 A | * | 8/1999 | Andresen | 455/431 |
| 6,014,606 A | * | 1/2000 | Tu | 701/200 |
| 6,151,497 A | * | 11/2000 | Yee et al. | 455/430 |
| 6,201,797 B1 | * | 3/2001 | Leuca et al. | 370/316 |
| 6,741,841 B1 | * | 5/2004 | Mitchell | 455/188.1 |
| 6,781,968 B1 | * | 8/2004 | Colella et al. | 370/316 |
| 2005/0215249 A1 | * | 9/2005 | Little et al. | 455/431 |

* cited by examiner

*Primary Examiner*—Tan Trinh
(74) *Attorney, Agent, or Firm*—Brian S. Steinberger; Law Offices of Brian S. Steinberger, P.A.

(57) ABSTRACT

A system and method for mobile ground-to-air and air-to-ground communication network acceleration. The system and method can reduce the cost of airborne communication services by creating a faster connection and thus increasing data throughput. In one embodiment, the communication network acceleration system and method provide as much as a four-fold increase over standard high-speed data rates. This increase is made possible in part through the integration, implementation, and use of acceleration and compression technologies in the ground system that supports communications to and from an airborne terminal.

27 Claims, 4 Drawing Sheets

COMMUNICATION NETWORK ACCELERATION SYSTEM AND METHOD

RELATED APPLICATION

The present application claims priority to U.S. Provisional Application Ser. No. 60/694,289, filed Jun. 27, 2005, and entitled "COMMUNICATION NETWORK ACCELERATION SYSTEM AND METHOD," which is hereby incorporated by reference.

FIELD OF THE INVENTION

The invention relates generally to satellite communication systems and methods and, more particularly, to systems and methods for providing high-speed satellite-based communications with mobile air and surface communications devices.

BACKGROUND OF THE INVENTION

There are several types of satellites deployed into orbit around the earth. Some satellites reflect communications directed at the satellite. Many satellites carry repeaters for receiving and retransmitting a received communication. In recent years, satellites have been placed in orbits synchronous with the earth's rotation, thereby providing continuous communications capabilities in almost all regions of the globe.

If a satellite is placed in synchronous orbit above the equator to revolve in the same direction of the earth's rotation and synchronized with the earth's rotation, the satellite will continually remain above a fixed point on the surface of the earth. Many communications satellites have been placed in these synchronous orbits to cover different regions of the globe.

Generally, active communications satellites are orbiting repeaters with broadband characteristics. A signal from a ground station is intercepted by the satellite, converted to another frequency, and retransmitted at a moderate power level to an end user receiver. This provides much better signal strength at the receiving end of the circuit as compared with a signal that is merely reflected from a passive satellite. Active communications satellites are placed in synchronous orbits, making it possible to use them with fixed antennas, a moderate level of transmitter power, and at any time of the day or night. Synchronous satellites are used for television and radio broadcasting, communications, weather forecasting, and military operations.

Further, a constellation of satellite systems is used to cover major regions of the globe to enable ground-to-aircraft (and aircraft-to-ground) communications via the satellite systems. One example of such a constellation is INMARSAT III, which currently comprises four satellites located in geostationary orbits, each generally covering a region of approximately one-fourth of the globe with a certain amount of overlap between regions. These satellites are referred to as AOR-W (Atlantic Ocean Region—West), AOR-E (Atlantic Ocean Region—East), IOR (Indian Ocean Region), and POR (Pacific Ocean Region). Another satellite constellation example is INMARSAT IV, which will comprise three satellites providing the same coverage as the four INMARSAT III satellites it will replace as well as additional services, such as Broadband Global Area Network (BGAN) and Swift Broadband (SBB).

INMARSAT satellites support various different types of communications services to the aeronautical market. These services are currently defined as AERO H, AERO H+, AERO I, Swift 64, and AERO M. SBB will also soon be available and is similar to BGAN but designed for AERO. All of these services are generally available to aeronautical users. An airborne satellite communication system can provide an aircraft with multiple digital voice, fax, and real-time Internet communications capabilities. These systems are specifically adapted for use in global two-way, ground-to-air communications by aircraft operators requiring global voice, fax, and Internet communications for their flight crews and passengers.

As the general communications need to transmit more data in larger files at faster speeds grows, so too does the need for faster connections and increased data throughput. This holds true for any communications system, whether strictly ground-based, air-to-ground, or ground-to-air. One way developers of ground-based systems have addressed this need is through the use of acceleration and compression technologies. Acceleration and compression can be achieved through any number of techniques to reduce data traffic volumes such as selective caching, vertical data analysis, adaptive packet compression, packet aggregation and flow control, and so on. This ground-based technology contributes to increasingly faster connection speeds.

Current ground stations have yet to implement acceleration technologies, however, and typically only provide connection speeds of 33.6 kbps on a single Mobile Packet Data Service (MPDS) channel, or up to 256 kbps on a four-channel system. For example, one current method for obtaining greater speeds in a Swift 64 ground-to-air communication system is to install additional Swift 64 units on the aircraft and combine the units to create a higher speed connection. This method of using more channels, without increasing the data transfer rate across any individual channel, may increase overall connection speed, but not in an efficient, cost-effective manner.

The same need for high-speed data connections that currently exists in the office or at home also exists in aircraft cabins. Until now, however, ground stations that support global two-way, air-to-ground (ATG), and ground-to-air (GTA) communications have not offered equivalent increases in data rates, and especially not in a cost-effective way.

SUMMARY OF THE INVENTION

The invention disclosed herein addresses the problem of disparate connection speeds between ground-based and ground-to-air based communication systems by increasing the effective network capacity of ground-to-air (GTA) and air-to-ground (ATG) communication systems. The invention helps reduce the cost of airborne communication services by creating a faster connection and thus increasing data throughput.

In one embodiment, an accelerated GTA and ATG communication system comprises at least one mobile aircraft-based communication system, a ground-based communication system, and a satellite communication system. The at least one mobile aircraft-based communication system is adapted to transmit and receive accelerated data signals and comprises a data communication accelerator device adapted to accelerate and decelerate data signals received by the mobile aircraft-based communication system. The ground-based communication system is adapted to transmit and receive accelerated data signals and comprises a data communication router device adapted to route accelerated and non-accelerated data signals, and a multi-user data communication accelerator device communicatively coupled to the data communication router device and to a data network and adapted to accelerate and decelerate data signals from the data network and the data communication router device. The satellite communication system is communicatively coupled to the mobile air communication system and to the ground-based communication system and is adapted to transmit accelerated data signals between the mobile air communication system and the ground-based transceiver station that supports both ATG and GTA communications.

In one embodiment of a method of accelerating GTA and ATG communications according to the invention, a data stream is generated at a mobile aircraft. The data stream is accelerated at the mobile aircraft and transmitted from the mobile aircraft to a ground station through a satellite communication system. The data stream is decelerated at the ground station and routed to a destination. The method can further comprise generating a data stream at the ground station and determining a mobile aircraft destination of the data stream. The data stream can then be optionally accelerated based upon the destination and transmitted to the mobile aircraft. If the data stream is accelerated, the data stream can be decelerated and routed to a destination.

The above summary of the invention is not intended to describe each illustrated embodiment or every implementation of the present invention. The figures and the detailed description that follow more particularly exemplify these embodiments.

Figure 1:
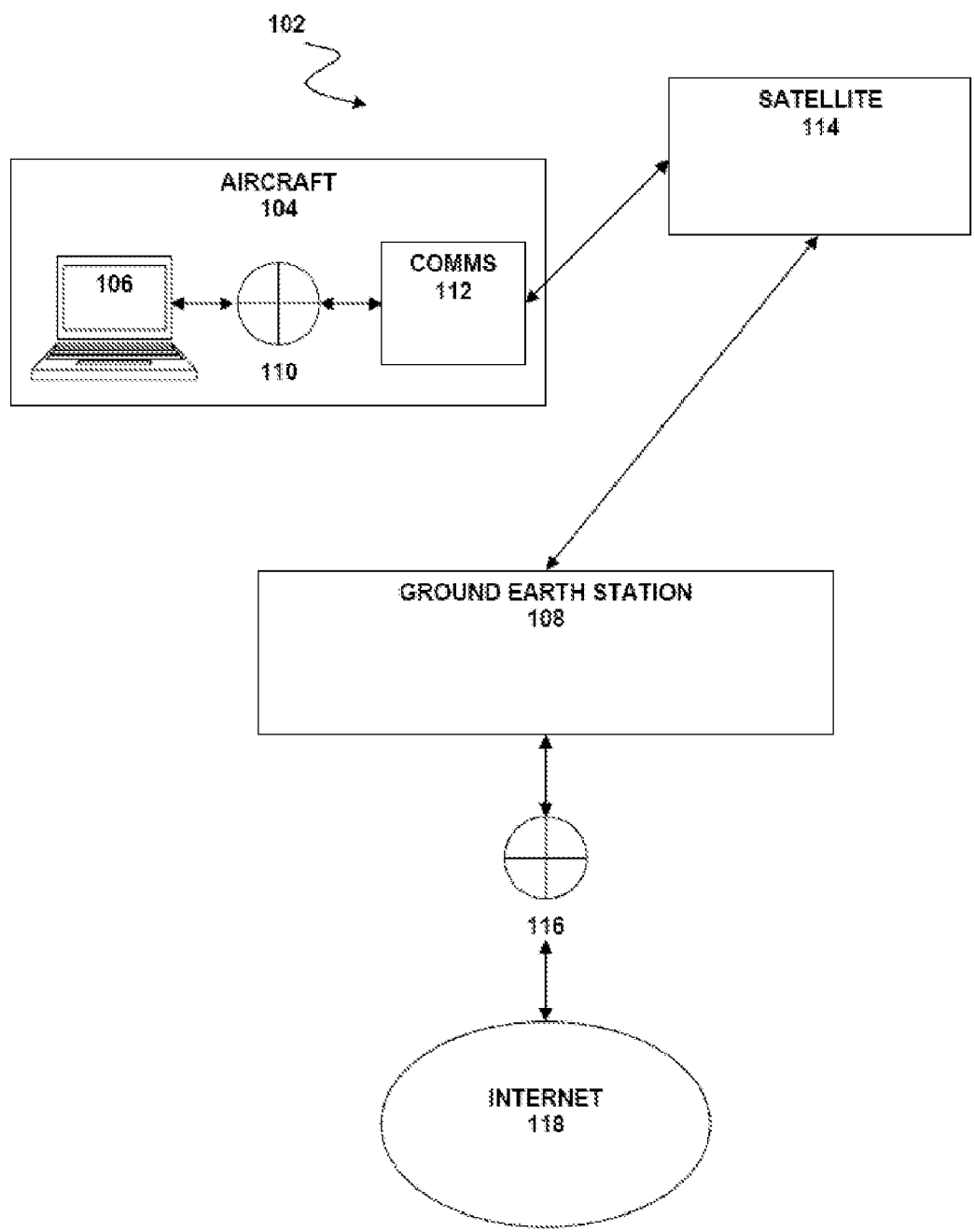
FIG. 1 is a diagram of a mobile ground-to-air communication system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The communication network acceleration system and method disclosed herein significantly increase the effective network capacity of current ground-to-air/air-to-ground (GTA/ATG) communication systems in an efficient and cost-effective manner. The communication network acceleration system and method of the present invention can provide as much as a four-fold increase over standard high-speed data rates in various embodiments. This increase is made possible in part through the integration, implementation, and use of acceleration and compression technologies in the GTA/ATG communication system. The implementation and use of these technologies increase data transfer rates without having to increase the number of communication channels. The system accomplishes these benefits in part through the use of a cabin network device that accelerates data generated from within an aircraft, and a ground-based network accelerator that can support multiple connections.

In one embodiment, a cabin network accelerator is installed in an aircraft in place of a standard router and is implemented into the aircraft's ATG communication system. Each aircraft is provided with its own Internet protocol (IP) subnet such that the airborne and ground-based accelerators are able to recognize that the data stream is to be accelerated or decelerated, respectively. The accelerator uses a combination of compression and acceleration technologies to significantly increase the bandwidth of the communication network. This accelerated traffic from the aircraft is then transmitted by satellite to a ground earth station (GES). The GES recognizes that the traffic is accelerated, based upon the aircraft's IP address in one embodiment, and routes the traffic to a multi-user network accelerator where the traffic is subsequently decelerated. The decelerated traffic is then routed to a communication network, such as the Internet. Similarly, for GTA traffic, data from the Internet or another source reaches the multi-user network accelerator at the GES, the destination IP address of an aircraft is recognized as compatible with acceleration, and the data is accelerated. The accelerated data is transmitted by satellite to the aircraft, where the data is subsequently decelerated by the cabin network accelerator and sent to a data device, such as a computer, laptop, PDA, cell phone, or other data device.

FIG. 1 illustrates one embodiment of a typical non-accelerated GTA/ATG communication system 102. A user onboard an aircraft 104 opens an application on a device 106 requiring an ISDN, MPDS, or Broadband call by aircraft 104 to a ground earth station (GES) 108 to establish a connection for data transmission, receipt, and/or exchange. Data from device 106, which can comprise a computer or other similar device, such as a PDA, cell phone, and the like, is sent by an aircraft router 110 in a data stream to a communication unit 112 that transmits the data signal to an INMARSAT satellite 114. In one embodiment, communication unit 112 comprises a Swift 64 unit. INMARSAT satellite 114 in turn transmits the data to GES 108. An Internet service provider's remote access router (RAR) 116 then directs the data stream onto the Internet 118 or another communication network, where the data is transmitted to a destination. As mentioned previously, this type of system suffers from several drawbacks related in particular to data transmission, such as limited bandwidth and relatively high data transfer costs.

Figure 2:
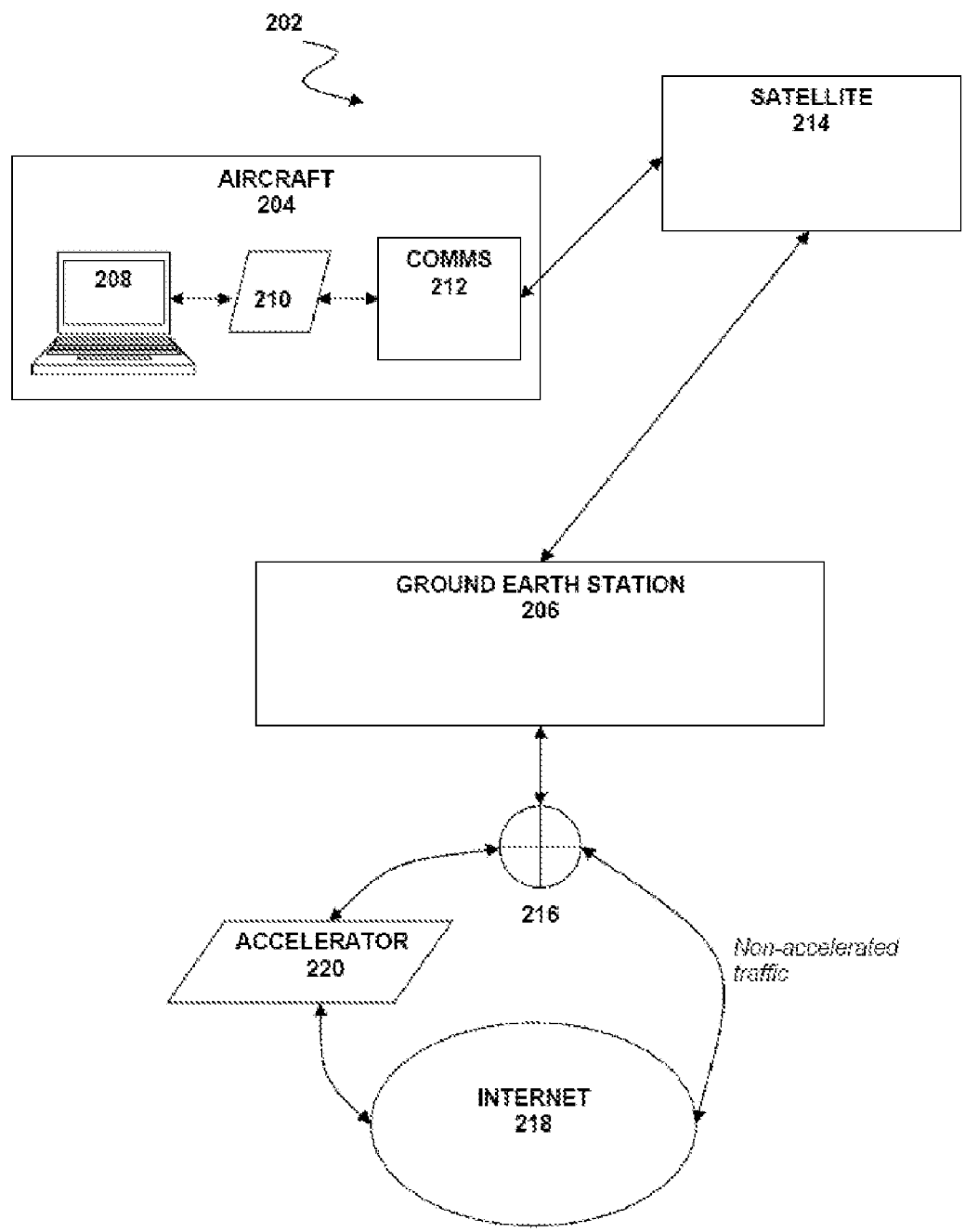
FIG. 2 is a diagram of an accelerated mobile ground-to-air/air-to-ground communication system according to one embodiment of the invention.

FIG. 2 depicts one embodiment of a network accelerated GTA/ATG communication system 202 according to the present invention. System 202 facilitates accelerated communications between an aircraft 204 and a GES 206. System 202 comprises an airborne data device 208 such as a computer, laptop computer, PDA, cell phone, media device, mobile data device, and the like, a cabin network accelerator 210, a communication unit 212, a satellite communication network 214, GES 206, an RAR 216, a multi-user network accelerator 220, and a communication network 218, such as the Internet.

Figure 3:
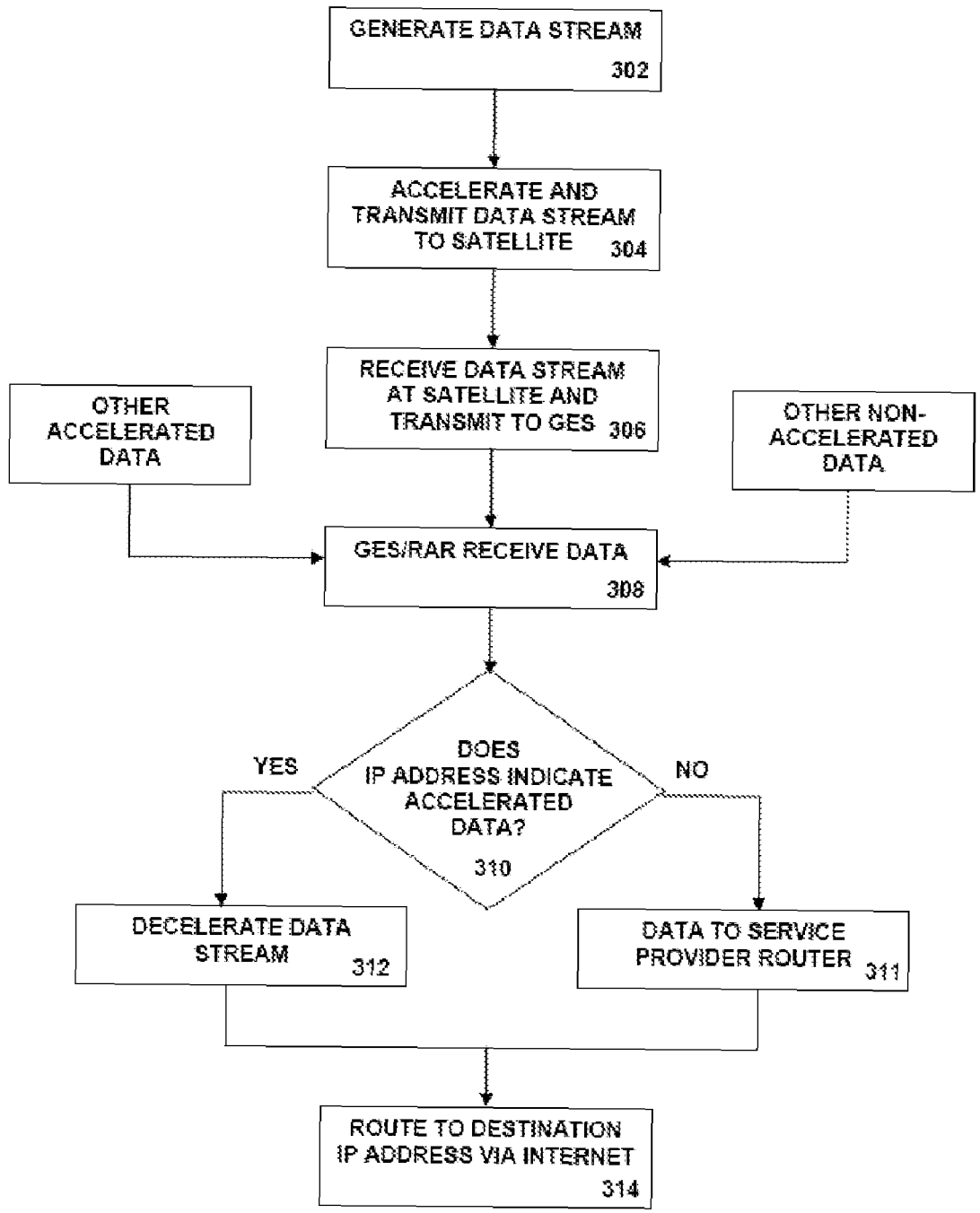
FIG. 3 is a flowchart of one embodiment of an air-to-ground communication method according to one embodiment of the invention.

Referring to FIGS. 2 and 3, the system and method of the invention transmit a data stream generated by device 208 in the cabin or flight deck of aircraft 204 to, for example, the Internet 218 at an accelerated delivery rate. In one embodiment, a user of device 208 aboard aircraft 202 opens an application, requests a procedure, or otherwise initiates a data-related request that utilizes a connection to the Internet 218 or another network, generating a data stream at step 302. In one embodiment, the connection is a 28# connection. The data stream is sent to accelerator 210, where the data stream is accelerated and transmitted to satellite communication network 214 by communication unit 212 at step 304. In one embodiment, accelerator 210 comprises a Cabin Network Accelerator (CNX™) commercially available from EMS SATCOM. Accelerator 210 provides basic networking functions and data acceleration and is compatible with the INMARSAT Swift 64 satellite communication network 214 in various embodiments. Accelerator 210, as part of the system and method of the invention, increases effective bandwidth by using a combination of acceleration techniques including selective caching, vertical data analysis, adaptive packet compression, packet aggregation, packet flow control, and packet loss recovery, among others known to those skilled in the art.

Satellite communication network 214 receives the accelerated signal from aircraft 204 and transmits the signal to GES 206 at step 306. RAR 216 receives the signal from aircraft 204 via satellite communication network 214, and also optionally receives signals from other aircraft and sources at step 308. The data received by RAR 216 can comprise both accelerated and non-accelerated data. RAR 216 analyzes the received signal(s) to determine appropriate handling and routing at step 310. In one embodiment, RAR 216 determines whether the data originating from device 208 or from other devices is accelerated based upon on a source IP address.

Upon determining that the data is accelerated in this example embodiment, RAR 216 routes the data to multi-user network accelerator 220. In one embodiment of the invention, multi-user network accelerator 220 at GES 206 is an Expand Xstream Network Accelerator model manufactured by Expand Network. System 202 can support up to 1,000 accelerator connections in one embodiment, although other embodiments may support more or fewer. Multi-user network accelerator 220 then decelerates the accelerated traffic at step 312 and appropriately routes the traffic, for example to the Internet 218, at step 314. Non-accelerated traffic 255, again determined by a source IP address or other method in one embodiment at step 310, is routed directly to the Internet 218 at steps 311 and 314.

Figure 4:
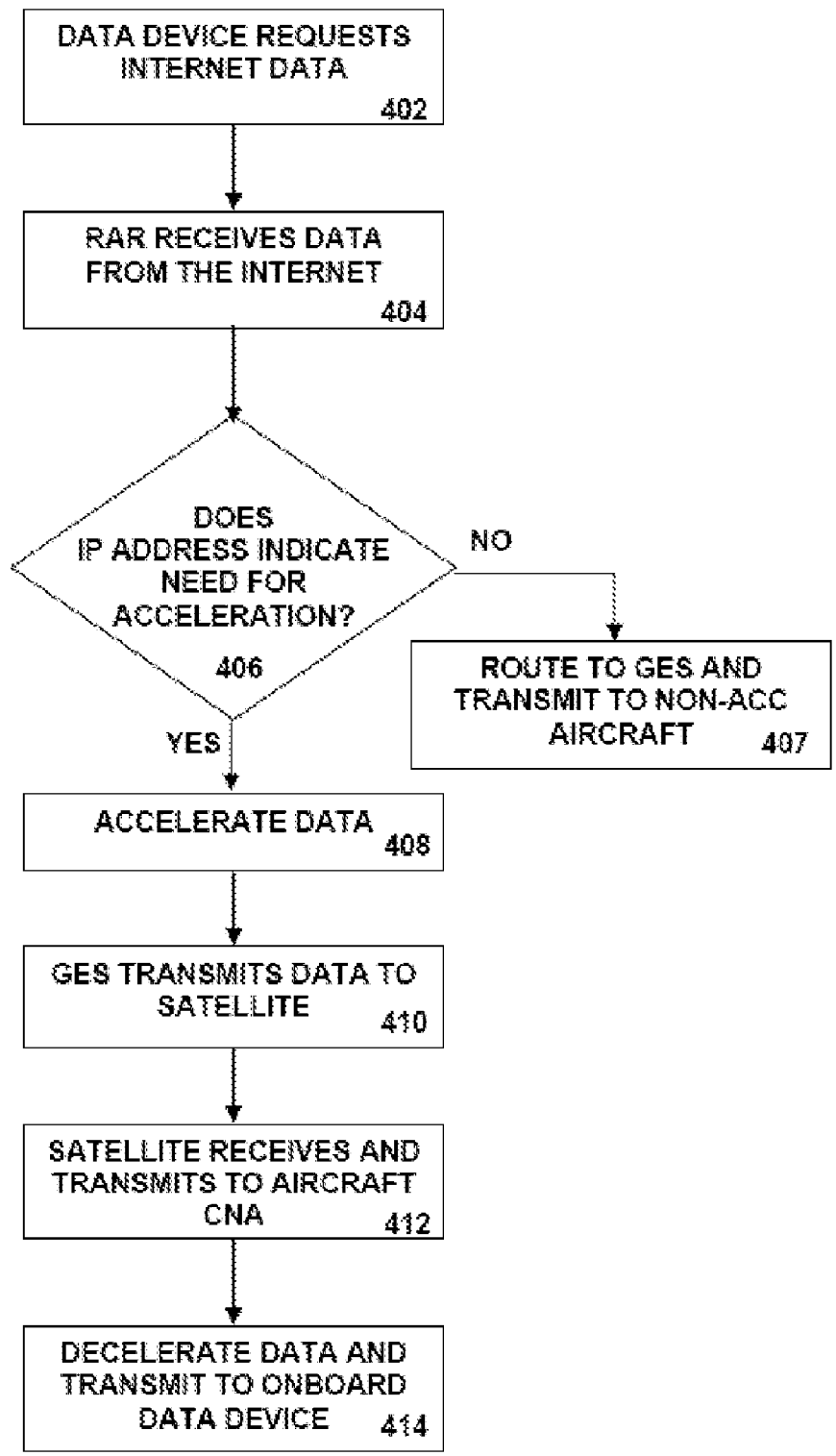
FIG. 4 is a flowchart of one embodiment of a ground-to-air communication method according to one embodiment of the invention.

FIG. 4 is a flowchart of one embodiment of a reverse GTA transmission through the accelerated communication network according to the invention, when airborne data device 208 requests data. Referring to FIGS. 2 and 4, and for GTA traffic, data from the Internet 218 is passed through an ISDN, MPDS, SwiftBroadband, or other channel to accelerator 220 and RAR 216 at step 404 after a request at step 402. In one embodiment, RAR 216 determines whether the data is accelerated traffic based upon the destination IP address at step 406, in this example the aircraft IP subnet, and passes this traffic through multi-user network accelerator 220. Data not to be accelerated is routed to non-accelerator equipped aircraft at step 407.

Accelerated data traffic is then accelerated at step 408 and transmitted from GES 206 to aircraft 204 and device 208 via satellite network 214 and communication unit 212 at step 410. In one embodiment, the accelerated data is transmitted as an ISDN, MPDS, or SwiftBroadband packet. The accelerated traffic is then transmitted to and received onboard aircraft 204 at step 412 and passed to the aircraft's accelerator 210. There the received traffic is decelerated and routed to device 208 at step 414.

The communication network acceleration systems and methods disclosed herein can therefore significantly increase the effective network capacity of current GTA/ATG communication systems in an efficient and cost-effective manner. Additional benefits are also provided in various embodiments, including by Aero X™ available from Satcom Direct, the assignee of the present application. These benefits include compatibility with existing hardware, including antennae and amplifier components; compatibility with common computer operating systems, such as MICROSOFT WINDOWS; and secure communications through compatibility and interoperability with encryption devices. Mobile air access to data, email, video conferencing, web browsing, and other communications formats at accelerated rates can thus be provided in a cost-effective manner. The invention may be embodied in other specific forms without departing from the essential attributes thereof, therefore, the illustrated embodiments should be considered in all respects as illustrative and not restrictive.

The invention claimed is:

1. An accelerated ground-to-air and air-to-ground communication system comprising:
   at least one mobile aircraft-based communication systems adapted to transmit and receive accelerated data signals, the mobile aircraft-based communication systems comprising a data communication accelerator device adapted to accelerate and decelerate data signals received by the mobile aircraft-based communication system;
   a ground-based communication system adapted to transmit and receive accelerated data signals comprising:
      a data communication router device adapted to router accelerated and non- accelerated signals, and
      a multi-user data communication accelerator device communicatively coupled to the data communication router device and to a data network and adapted to accelerate and decelerate data signals from the data network and the data communication router device; and
   a satellite communication system communicatively coupled to the mobile air communication systems and to the ground-based communication system and adapted to transmit accelerated data signals between the mobile air communication systems and the ground-based communication systems.

2. The systems of claim 1, wherein the mobile aircraft-based communication systems further comprise a data communication device communicatively coupled to the data communication accelerator device and adapted to generate and receive non-accelerated data signals.

3. The system of claim 2, wherein the data communication device is selected form the group consisting of a computer device, a laptop computer device, a cell phone, a personal digital assistant (PDA), a media device, and a mobile data device.

4. The system of claim 2, wherein the data communication device comprises a 28# communication connection.

5. The system of claim 1, wherein mobile aircraft-based communication system is further adapted to transmit and receive non-accelerated data signals, the ground-based communication system is further adapted to transmit and receive non-accelerated data signals, and the satellite communication systems is further adapted to transmit non-accelerated data signals between the mobile air communication system and the ground-based communication system.

6. The system of claim 1, wherein the mobile aircraft-based communication system further comprises a communication device communicatively coupled to the data communication accelerated device and the satellite communication systems.

7. The system claim 1, wherein the data network comprises the Internet.

8. The system of claim 1, wherein the satellite communication system comprises an INMARSAT satellite.

9. The system of claim 1, wherein data communication accelerator device is adapted to accelerate data signals by increasing an effective signal bandwidth.

10. The system of claim 9, wherein the data communication accelerator device is adapted to increase and effective signal with bandwidth through at least one acceleration technique selected from the group consisting of selective catching, vertical data analysis, adaptive packet compression, packet aggregation, packet flow control, and packet loss recovery.

11. The system of claim 1, wherein the data communication router device is communicatively coupled to the data network and adapted to route non-accelerated data signals to the data network be bypassing the multi-user communication accelerator device.

12. The system of claim 11, wherein the data communication router device is adapted to route accelerated and non-accelerated data signals according to an IP address.

13. The system of claim 1, where in the communicative coupling between the multi-user data communication accelerator device and the data network comprises at least one selected from the group consisting of an ISDN channel, an MPDS channel, and a SwiftBroadBand channel.

14. The system of claim 1, where in the satellite communication system is further adapted to transmit accelerated data signals between the mobile air communication system and the ground-based communication system as a data packet selected from the group consisting of an ISDN packet, an MSDS packet, and a SwiftBroadBand packet.

15. A method of accelerating ground-to-air and air-to-ground communication comprising the steps of:
    initiating a request for data by a data device at the mobile aircraft;
    transmitting the request for data from the data device to a data communication accelerator device at the mobile aircraft;
    generating a data stream comprising data request at a mobile aircraft;
    accelerating the data stream comprising the data request at the mobile aircraft;
    transmitting the accelerated data stream from the mobile aircraft to a ground station through a satellite communication system;
    decelerating the data stream at the ground station; and
    routing the deceleration data stream to a destination.

16. The method of claim 15, further comprising the steps of:
    generating a data stream at the ground station;
    determining a mobile aircraft destination of the data stream;
    optionally accelerating the data stream base upon the destination;
    transmitting the data stream to a the mobile aircraft; and
    if the data stream is accelerated, decelerating the data stream at the mobile aircraft and routing the deceleration data stream to a mobile aircraft-based destination.

17. The method of claim 16, wherein the step of accelerating the data stream at the end mobile aircraft and the step of optionally accelerating the data stream based upon the destination further comprises increasing an effective signal bandwidth through at least one acceleration technique selected from the group consisting of selective caching, vertical data analysis, adaptive packet compression, packet aggregation, packet flow control, and packet loss discovery.

18. The method of claim 16, wherein the step of generating a data stream at the ground station further comprises receiving a data request from the mobile aircraft for the data stream.

19. The method of claim 16, wherein the step for routing the decelerated data stream to a destination further comprises routing the decelerated data stream to an IP address.

20. The method of claim 15, wherein the step of determining a mobile aircraft destination of the data stream further comprises determining an IP address of the data device.

21. A system for accelerating ground-to-air and air-to-ground communications comprising:
    means for initiating request for data by a data device at the mobile aircraft;
    means for transmitting the request for data from the data device to a data communication accelerator device at the mobile aircraft;
    means for generating a data steam comprising the data request at a mobile aircraft;
    means for accelerating and decelerating the data stream comprising the data request generated at or received by the mobile aircraft;
    means for transmitting a data stream between the mobile aircraft and a ground station through a satellite communication system;
    means for accelerating and decelerating a data stream received by or generated at the ground station;
    means for determining the destination of the data stream, wherein the destination comprises one of a ground-based destination and a mobile aircraft destination; and
    means for routing the decelerating data stream at the ground station to a destination.

22. The system of claim 21, wherein the means for generating a data stream at a mobile aircraft is selected from the group consisting of a computed device, a laptop computer device, a cell phone, a personal assistant (PDA), a media device, and a mobile data device.

23. The system of claim 21, where in the means for accelerating and decelerating a data stream generating at or received by a mobile aircraft and the means for accelerating and decelerating a data stream received by or generated at the ground station further comprise means for increasing an effective signal bandwidth through at least one acceleration technique selected from the group consisting of selective caching, vertical data analysis, adaptive packet compression, packet aggression, packet flow control, and packet loss recovery.

24. The system of claim 21, wherein the destination is an IP address.

25. The system of claim 21, wherein the means for transmitting a data stream between the mobile aircraft and ground station through a satellite communication system further comprise at least one communication channel selected from the group consisting of an ISDN channel, an MPDS channel, and a SwiftBroadBand channel.

26. The system of claim 21, wherein the satellite communication system comprises an INMARSAT satellite.

27. The system of claim 21, wherein the means for accelerating and decelerating a data stream received by or generated at the ground station further comprise multi-user means for accelerating and decelerating data streams.

* * * * *